United States Patent [19]

Park

[11] Patent Number: 5,448,380
[45] Date of Patent: Sep. 5, 1995

[54] COLOR IMAGE PROCESSING METHOD AND APPARATUS FOR CORRECTING A COLOR SIGNAL FROM AN INPUT IMAGE DEVICE

[75] Inventor: Doo-sik Park, Suwon-city, Rep. of Korea

[73] Assignee: Samsung Electronics Co., Ltd., Kyungki-do, Rep. of Korea

[21] Appl. No.: 168,304

[22] Filed: Dec. 17, 1993

[30] Foreign Application Priority Data

Jul. 31, 1993 [KR] Rep. of Korea .................. 93-14995

[51] Int. Cl.⁶ .............................................. H04N 1/46
[52] U.S. Cl. ...................................... 358/520; 358/518
[58] Field of Search .............................. 358/518, 520; H04N 1/46

[56] References Cited

U.S. PATENT DOCUMENTS 4,989,080 1/1991 Ito ........................................ 358/520

Primary Examiner—James J. Groody
Assistant Examiner—Cheryl Cohen
Attorney, Agent, or Firm—Lowe, Price, Leblanc & Becker

[57] ABSTRACT

A color image processor and method thereof which performs a first conversion on the output signal of a color image input device into the intermediate color space, and divides the region according to the deviation characteristics in the converted intermediate color space, and re-corrects the color, includes a first transform matrix, a region discriminator and a plurality of transform matrices.

7 Claims, 5 Drawing Sheets

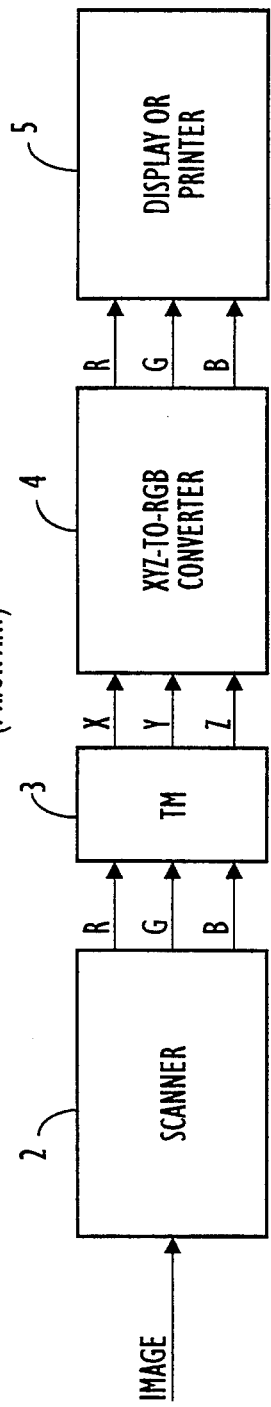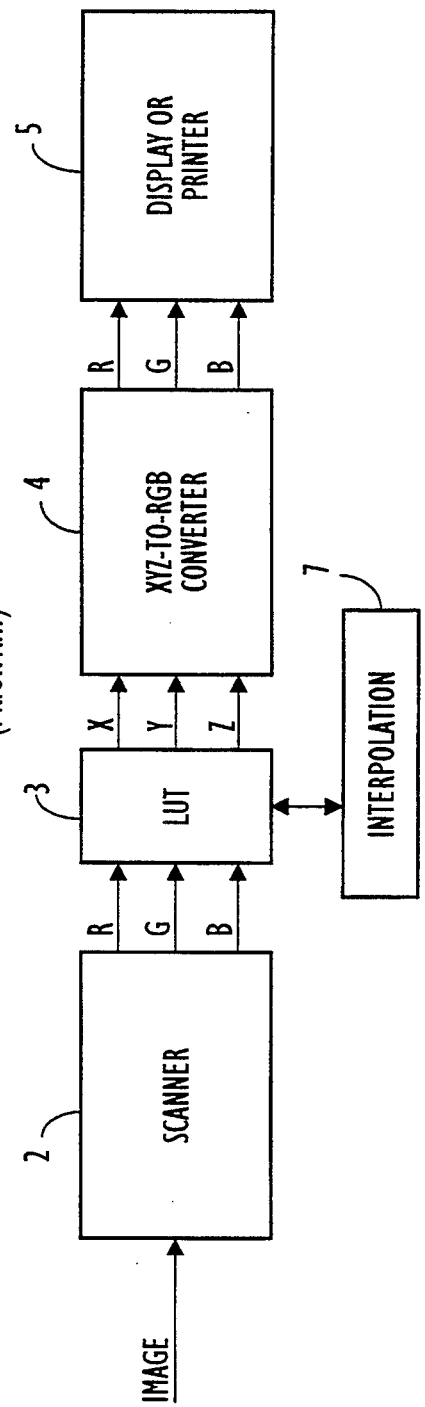

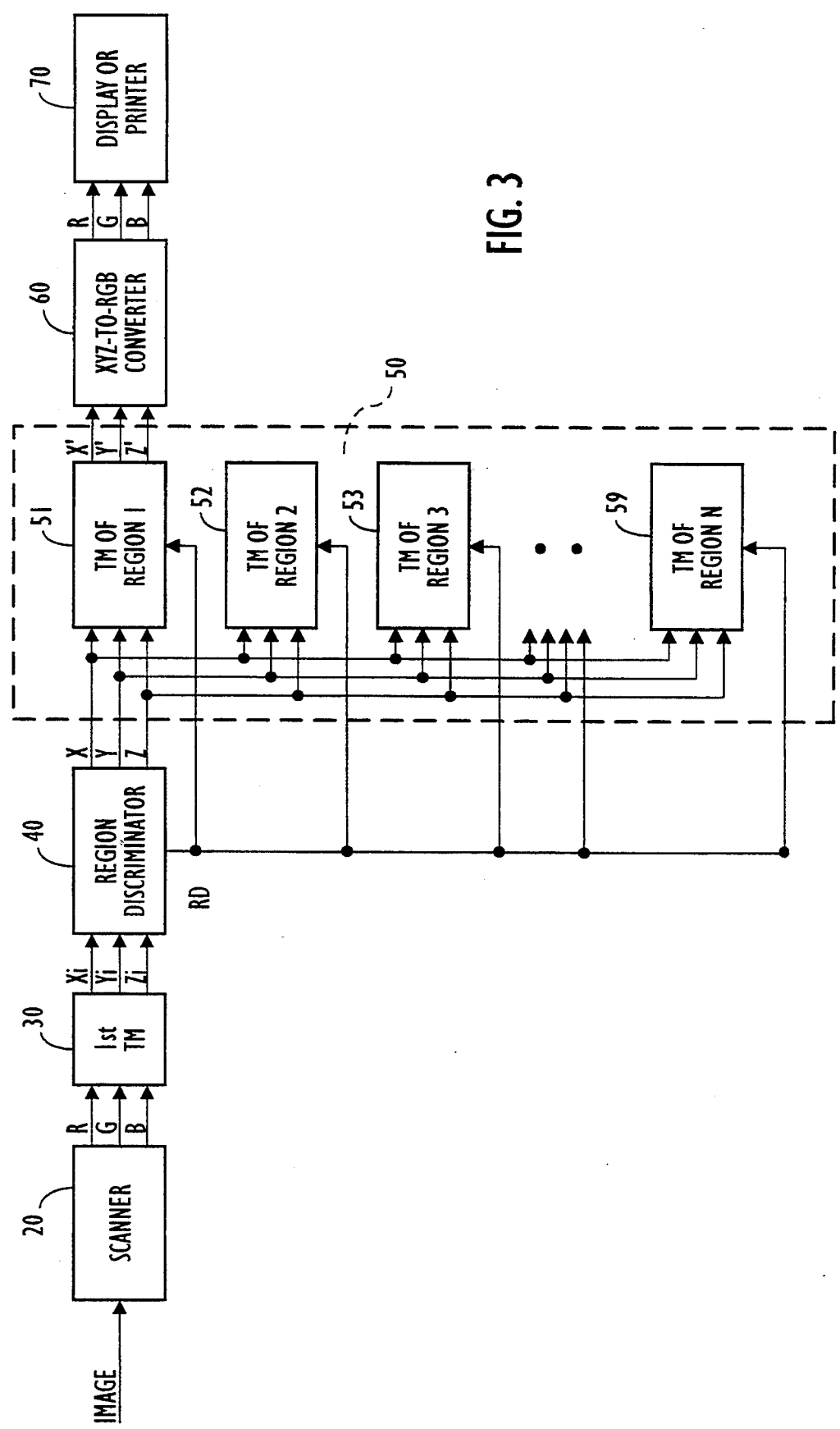

COLOR IMAGE PROCESSING METHOD AND APPARATUS FOR CORRECTING A COLOR SIGNAL FROM AN INPUT IMAGE DEVICE

BACKGROUND OF THE INVENTION

The present invention relates to a color image processing method and device thereof, and more particularly, to a color image processing method and apparatus which converts the output signal of a color image input device into an intermediate color space, divides regions in accordance with error characteristics in the transformed intermediate color space and re-corrects the color.

Generally, in a color image input device which converts image information into an electrical signal using a light-to-current converter, i.e., an image sensor like a charge-coupled device, the electrical signal output is usually divided into three colors (red, green and blue) which are used to represent the color information of the image. When this color image information is represented by the integration of the red, green and blue electrical signals, various devices output a variety of values with respect to the same image, depending on the particular design of an image input device by a given manufacturer. In this case, when the image is re-produced via an image output device using the above output value, each reproduced image is reflected by the characteristics of each image input device excluding the distortion of the image output device. As a result, the original image is not correctly expressed. This can be an even more serious problem under a network environment where various image input and output devices are employed simultaneously.

To solve the problem, a method has been introduced for reducing the characteristic errors of image input device and image output device by identifying the relationship between the spectrum of the input device and the intermediate coordinates and the relationship between the spectrum of output device and the intermediate coordinates, based on new intermediate coordinates. Here, the color space (CIEXYZ/L*a*b and so on) proposed by the Commission Internationale de l'Eclairage (CIE) is generally used as the intermediate coordinates. However, a conversion error is generated in the course of transform, and a large amount of time and memory capacity is consumed.

As conventional representative methods wherein the output signal of the image input device is converted into the value of the intermediate coordinate field (color space), there are transform methods by a model and by a look-up table (LUT).

The transform method by a model is one in which a model is assumed and the variable of the model is optimized based on physical measurements under specified conditions. A typical model is in the form of a matrix and, here, a recurrent analysis is commonly used for optimizing the variable of the model. Currently used models include:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad \text{model 1}$$

$$\begin{bmatrix} X \\ Y \\ Z \end{bmatrix} = \begin{bmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \end{bmatrix} \begin{bmatrix} R \\ G \\ B \\ R^2 \\ G^2 \\ B^2 \end{bmatrix} \quad \text{model 2}$$

$$\begin{bmatrix} X \\ Y \\ Z \end{bmatrix} = \begin{bmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{bmatrix} \begin{bmatrix} R \\ G \\ B \\ R^2 \\ G^2 \\ B^2 \\ RG \\ RB \\ GB \end{bmatrix} \quad \text{model 3}$$

Here, model 1 is a linear transform ($3 \times 3$ matrix), model 2 is a square transform ($3 \times 6$ matrix), and model 3 is a cross-product and square transform ($3 \times 9$ matrix). The constituting of models in addition to the above three is possible. However, in doing so, the increase of the non-linear column makes the calculation more complicated, which reduces its practicality.

The variable value of the model can be calculated as follows. First, the output signals R, G and B of a scanner are obtained with respect to selected color samples. Second, the value of the color space CIEXYZ or L*a*b with respect to the color samples is obtained via an estimation under specific conditions. Third, the variable value of the model (transform ln matrix) is obtained by a recurrent analysis.

A color image processor is shown in FIG. 1, which converts the output signals R, G and B of a scanner into a color space signal using a transform matrix (TM) having the thus-obtained variable values.

When the characteristic of the output spectrum of the scanner is in accordance with the color matching function (the Luther condition), the output signal of the scanner can be converted into the value of the color space by a $3 \times 3$ linear transform matrix. However, when the output of scanner is transformed in color space value by using model 1 only, the conversion deviation is more serious than the case where non-linear column is included, since no scanner satisfies the Luther condition. Moreover, when the non-linear column increases, as in models 2 and 3, the time required for the exact transform also increases.

As models having more and more non-linear columns are applied, the number of color samples used for obtaining TM must also increase. In this case, when the variable value of the model is calculated using a few color samples, expressing the wide color region is more inappropriate than the case where model 1 is used.

The transform method by a look-up table is as follows. One to one correspondence relationship between the value of the color space with respect to the color sample and the R, G and B signals, i.e., an output signal of the scanner, is obtained using a lot of color samples. Then, based on the thus-obtained value, R, G and b color coordinates space of the scanner is divided into a regular matrix form using the interpolation and extrapolation methods. And, the value of the color space corresponding to each point is stored into a memory device for future use.

The transform look-up table can be obtained as follows. First, the color space value (CIEXYZ or L*a*b)

of the selected color sample is obtained using the colorimetry device tinder the specific condition. Second, the output signals R, G and B of the selected color sample are obtained. Third, the scanner output signal value and the color space value are interpolated so as to increase their corresponding point. Fourth, the scanner output signal value and the scope of the color space is divided into the desired matrix point (for example, $33 \times 33 \times 33 \times 6$ tetrahedron or cubic). Fifth, an action that the color space value corresponding to a predetermined matrix point within the gamut of the scanner signal is found and stored in the table is repeatedly performed. Sixth, if the desired matrix point does not exist within the gamut, the corresponding color space value is obtained and stored into the look-up table using extrapolation method.

A color image processor which converts the output of the scanner, i.e., R, G and B signals, into the signal of the color space using the thus-obtained transform look-up table, is shown in FIG. 2.

Though the look-up table transform method has the least conversion deviation among the conventional methods, the memory device is consumed much. In more detail, a look-up table with respect to the matrix point of $33 \times 33 \times 33$ requires at least a 200 Kb memory device, even though the color space value within the look-up table is stored as a constant type, and when the color space value in the look-up table is stored in the form of the real number, at least 400K bytes of memory is needed. Moreover, calculating the interpolation requires an excessive amount of time.

SUMMARY OF THE INVENTION

Accordingly, it is an object of the present invention to provide a color image processing method in such image input devices as scanners, facsimiles, copiers and cameras, wherein the conversion deviation and memory capacity are reduced and transform speed is increased in the course of converting the output signal of an image input device into the intermediate coordinates field.

It is another object of the present invention to provide a device most suitable for realizing the color image processing method.

To accomplish the above object, there is provided a color image processing method which corrects the color signal output from an arbitrary image input device, the method comprising the sequential steps of:
  obtaining model variable of the first transform matrix with respect to a selected all color samples;
  transforming R, G and B output signals from the image input device with respect to the color sample into the value of the color space using the first transform matrix of the model-variable obtaining step; and
  determining the error characteristics based on the color space value transformed in the transforming step and dividing regions, and selecting a model of each region, calculating the variable value of the model and storing the calculated value in the transform matrices by each region.

According to an aspect of the present invention, there is provided a color image processor which corrects the color signal output from an arbitrary image input device, comprises:
  a first transform matrix for holding a model variable obtained from all selected samples and for transforming R, G and B output signals from the image input device respect to the color sample into the value of the color space;
  a region discriminator for discriminating a regions that includes the transform color space value output from the first transform matrix and for selecting a second transform matrix; and
  second transform matrices for holding the model variable for respective regions.

BRIEF DESCRIPTION OF THE DRAWINGS

The above objects and other advantages of the present invention will become more apparent by describing in detail a preferred embodiment thereof with reference to the attached drawings in which:

FIG. 1 is a block diagram showing a conventional color image processor employing a transform matrix;

FIG. 2 is a block diagram showing a conventional color image processor employing a look-up table;

FIG. 3 is a block diagram showing an embodiment of a color image processing apparatus according to the present invention;

DETAILED DESCRIPTION OF THE INVENTION

Figure 4:
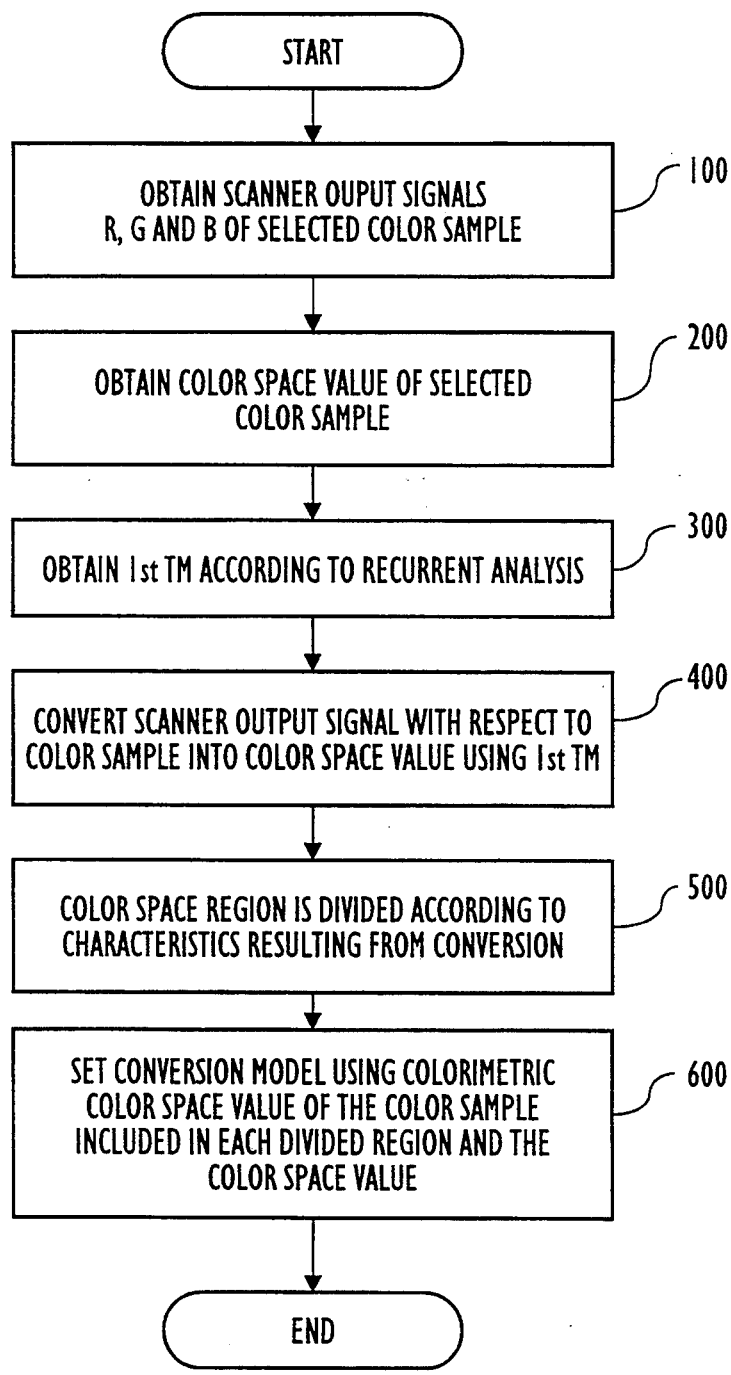
FIG. 4 is a flowchart for calculating the transform matrix for each region in FIG. 3.

The present invention will be described below in more detail with reference to the attached drawings.

FIG. 3 is a block diagram showing an embodiment of a color image processor according to the present invention, wherein a scanner is shown as an example of the image input device.

The color image processor shown in FIG. 3 consists of a scanner 20 which converts an image information into an electrical signal and outputs R, G and B signals, a first transform matrix 30 which transforms the output signals R, G and B of scanner 20 into the color space values X, Y and Z, a region discriminator 40 which discriminates and divided the region from the color space value transformed from first transform matrix 30, transform matrix for the respective regions 50 which is activated by RD signal caused by region discriminator 40 and transforms X, Y and Z into X', Y' and Z', an XYZ-to-RGB converter 60 which converts X', Y' and Z' signals output from TM for the respective regions 50 into R, G and B signals, and a display (or printer) 70 which outputs the R, G and B signals received from XYZ-to-RGB converter 60.

FIG. 4 is a flowchart for calculating the transform matrix for each region in the TM portion shown in FIG. 3. In step 100, scanner output signals R, G, and B of the selected color sample are obtained. In step 200, color space value (CIEXYZ or L*a*b) of the color space of the selected color sample is obtained under specific conditions. In step 300, the first transform matrix is obtained by the recurrent analysis method. In step 400, the scanner output signal relevant to the color sample is converted into the color space value using the obtained first transform matrix. In step 500, region in the color space is divided depending on the error characteristics in accordance with the conversion between the colorimetric color space value of the color sample and the color space value converted according to the first transform matrix. In step 600, a conversion model is set using the colorimetric color space value of the color sample included in each divided region and the color space value converted in accordance with the first transform matrix so that the variable value of the set conversion model can be obtained and stored into TM region units.

Figure 5A:
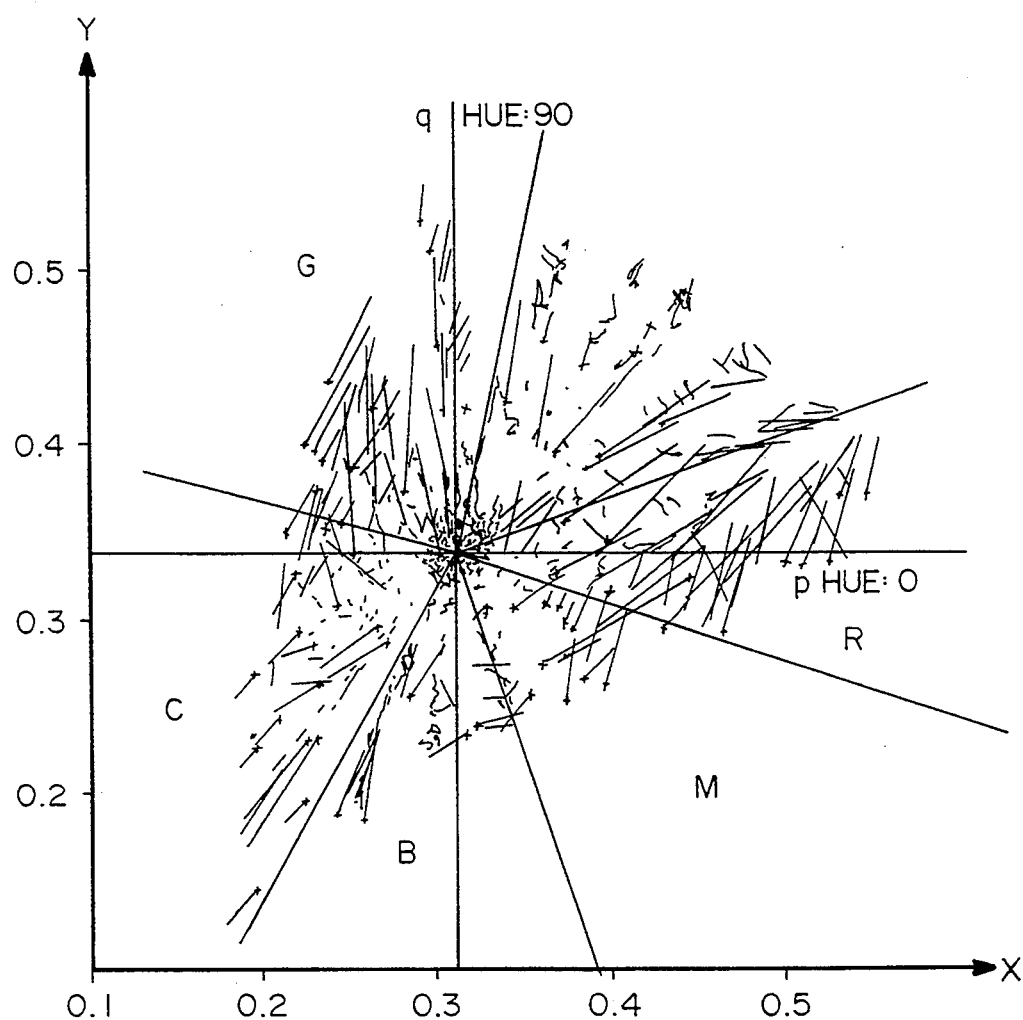
FIG. 5A is a graphical representation showing the hue shift between the chromaticity coordinates of the color sample transformed by the first transform matrix and the chromaticity coordinates of the colorimetric color sample.
Figure 5B:
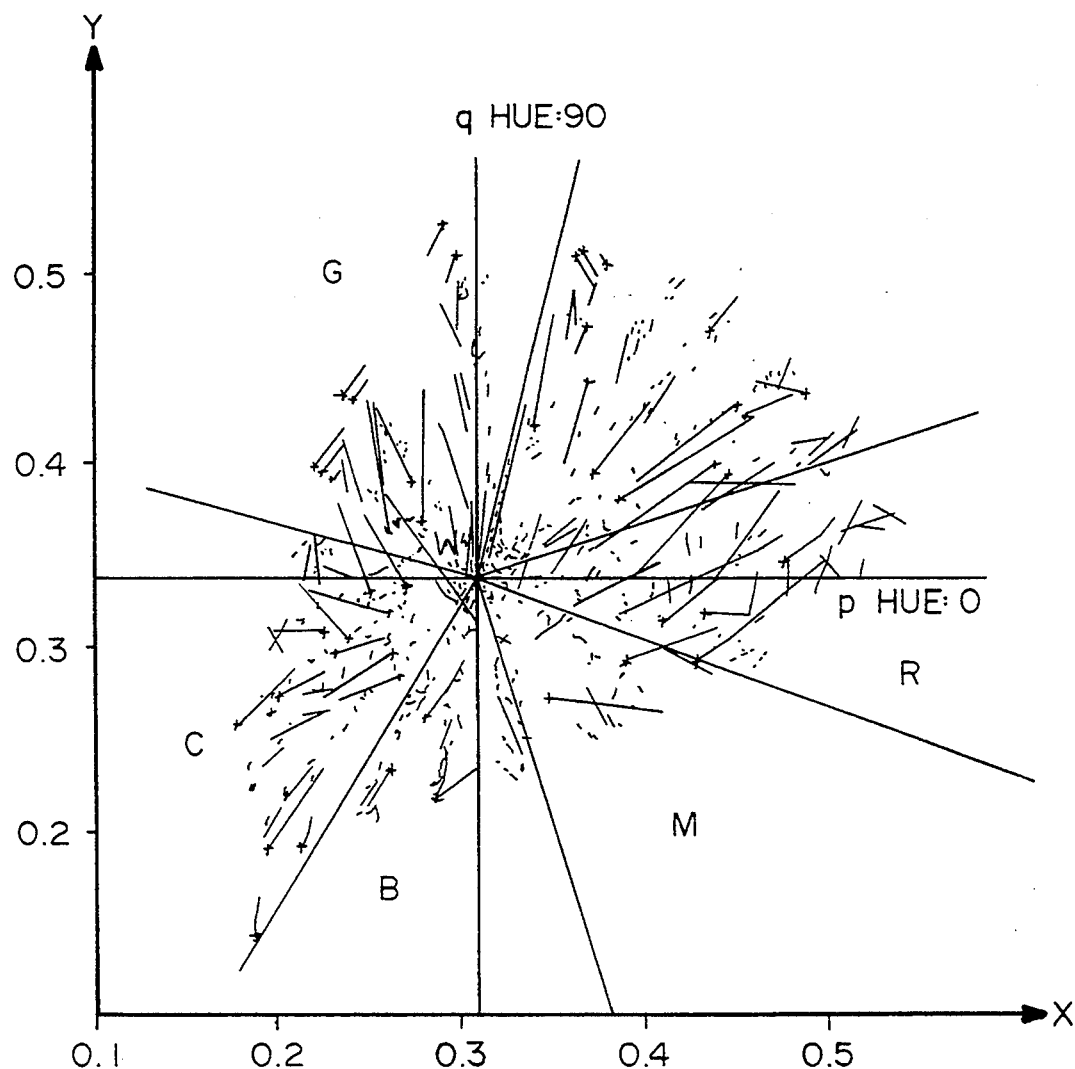
FIG. 5B is a graphical representation showing the hue shift between the chromaticity coordinates of the color sample transformed by TM for each region and the chromaticity coordinates of the colorimetric color sample.

FIG. 5A is a graphical representation showing the hue shift between the chromaticity coordinates of the color sample transformed by the first transform matrix and the chromaticity coordinates of the colorimetric color sample, and FIG. 5B is a graphical representation showing the hue shift between the chromaticity coordinates of the color sample transformed according to TM for each region and the chromaticity coordinates of the colorimetric color sample.

Operation of the color image processor according to the present invention will be explained with reference to FIGS. 3, 5A and 5B.

The present invention is constituted as follows. First, a model variable of the first transform matrix with respect to the selected entire color sample is obtained. The scanner output signals R, G, and B relevant to the color sample are converted into the color space value using the first conversion model. Then, the region is divided by discriminating the error characteristic based on the converted color space value. Model for each region is assumed so that the model variable value can be obtained and stored into TM for each region.

The output signals R, G, and B of an image input device (scanner 20) for an arbitrary original image, are transformed into the color space value by first transform matrix 30. Region discriminator 40 discriminates the region from the color space value, (converted from R, G, and B) and generates RD signal for selecting a TM, and a selected TM (one of TM for the respective regions 50) converts the color space value into the final value of the color space, and XYZ-to-RGB converter 60 converts the final value of the color space into the signal for display or primer 70.

The operation of region discriminator 40 and TM for the respective regions 50 will be explained by an embodiment thereof. The following embodiment is a region dividing method wherein a region is divided in dependence upon a hue shift.

First, scanner 20 inputs an arbitrary original image, i.e. a color sample, and outputs R, G and B signals with respect to the original image.

First transform matrix 30 converts R, G and B signals output from scanner 20 into the color space values Xi, Yi and Zi. These values are represented by x and y chromaticity coordinates with the colorimetric signals X, Y and Z of the corresponding color sample. FIG. 5A is an example which shows a hue shift inclination with respect to each color sample. In addition, the gray region (low saturation portion) is divided from the hue shift inclination. Then, the hue region is divided according to hue shift direction, based on the region where the saturation is high.

Referring to FIG. 5A, the letters R, Y, G, C, B and M denote each divided hue region. The gray region is identified as being inside a circle having a predetermined radius r, based on a neutral point. (In FIG. 5A, the neutral point is w, i.e., a chromaticity coordinates of the luminance used for colorimetry. In the present invention, the neutral point is a chromaticity coordinates of D65, that is, xw=0.31 and yw=0.33.) The value of radius r is predetermined and can be selected optionally so as to include the low saturation portion in accordance with the characteristics of each image input device, i.e., scanner. The gray region can be shaped other than as a circle.

The chromaticity coordinates value of Xi, Yi and Zi with respect to each color sample can be calculated according to the following expression (1) and the radius $r_i$ can be calculated by the following expression (2).

$$x_i = \frac{X_i}{X_i + Y_i + Z_i} \text{ and } y_i = \frac{Y_i}{X_i + Y_i + Z_i} \quad (1)$$

$$d_i = \sqrt{(x_i - x_w)^2 + (y_i - y_w)^2} \quad (2)$$

In the case of $d_1 < r$, the sample belongs to gray region, otherwise it belongs to another hue region.

When the hue region is divided as shown in FIG. 5A, the size (expressed as degrees of angle) of each region is determined by p and q axes which take neutral point w as a zero point. The p axis has 180 degrees from the zero degree, while q axis has 270 degrees from 90 degrees.

Respective hue regions of the present invention are determined as follows, wherein HA denotes hue degree.

R region: 341.57°<HA<0° or 0°<HA<18.43°
Y region: 18.54°<HA<76.43°
G region: 75.43°<HA<174.80°
C region: 174.80°<HA<239.60°
B region: 239.60°<HA<286.93°
M region: 286.93°<HA<341.57°

The hue degree can be calculated according to the following expression 3 and using condition decision expressions 1), 2) and 3).

$$dx = x_i - x_w \text{ and } dy = y_i - y_w \quad (3)$$

1) if dx>0 and dy>0, then HA=AG
2) if dx>0 and dy<0, then HA=AG+36C
3) if dx<0, then HA=AG+180 where AG equals $\tan^{-1}(dx/dy)$.

After the color samples are divided according to each region, the proper TM region is obtained by the recurrent analysis method. Expressions (1), (2) and (3), condition decision expressions 1), 2) and 3) and the HA data of each hue region unit are all incorporated in region discriminator 40.

When processing on the arbitrary image, the region is discriminated by passing the Xi, Yi, and Zi values (converted in the first transform matrix) through region discriminator 40. Then, the corresponding TM region is selected and Xi, Yi, Zi are converted into the final color space value.

Using the similar method, a method where the reflectance or lightness is region-divided is also possible, which can be performed more simply. The above two methods can be used simultaneously.

FIG. 5B shows a degree of the deviation between the final X, Y and Z of the color sample obtained by the hue dividing method of the present invention and the colorimetric chromaticity coordinates value of the color sample, on the chromaticity coordinates. FIG. 5B can be compared with FIG. 5A which shows the degree of the conversion deviation for the case where only the first conversion is performed, as a simple example.

In the embodiment of the present invention, the 3×3 linear model is used for both the first transform matrix and the plurality of transform matrices. However, a non-linear model can also be applied for a more accurate conversion.

Accordingly, a color image processor and method thereof according to the present invention has a smaller conversion deviation than that of model 3 (3×9 matrix) of the conventional color image processor, and has 3×3 matrix, to thereby facilitate the realization of the hardware. In addition, memory devices having smaller capacities (e.g., approximately 300 bytes) than the color image processing method using a look-up table whose capacity is at least 200K bytes are made available for hardware realization.

What is claimed is:

1. A color image processing method for correcting R, G, and B color signals output from an arbitrary image input device, comprising the sequential steps of:

obtaining a model variable of a first transform matrix with respect to a selected all color samples;

transforming the R, G and B output signals from said image input device with respect to the color samples into the color space value using the first transform matrix; and determining error characteristics based on the color space value transformed in said transforming step, dividing the color space into regions, and selecting a model of each region, calculating the variable value of a model, and storing the calculated value in a second transform matrix for each region.

2. A color image processing method according to claim 1, wherein region dividing is carried out according to a hue shift inclination change of said color image input device.

3. A color image processing method according to claim 1, wherein region dividing is carried out according to a reflectance or lightness inclination change.

4. A color image processing method according to claim 1, wherein region dividing is carried out by considering both a hue shift inclination change and a reflectance or lightness inclination change.

5. A color image processing apparatus for correcting the color signal from an arbitrary image input device, comprising:

a first transform matrix for holding model variables for a transform matrix with respect to selected all color samples (distributed in gamut of an image input device) and for transforming R, G, and B output signals from said image input device into a color space value;

a region discriminator for discriminating a region to which a transformed color space value by said first transform matrix belongs and for selecting a second transform matrix (one of TM of the respective regions 50); and transform matrices for holding model variables for respective regions and for transforming the color space value (converted from R, G, and B signals) into the final value of the color space.

6. A color image processing apparatus according to claim 5, wherein the color space is CIEXYZ.

7. A color image processing method for correcting R, G, and B color signals output from an arbitrary image input device, comprising the steps of:

obtaining a model variable of a first transform matrix with respect to a selected color sample having a colorimetric color space value;

transforming the R, G, and B output signals from the arbitrary image input device with respect the selected color sample into a color space value using the first transform matrix;

determining error characteristics based on the color space value transformed in said transforming step;

dividing the color space into regions responsive to the error characteristics in accordance with a conversion between the colorimetric color space value of the selected color sample and the color space value;

selecting a model for each of the regions using the colorimetric color space value and the color space value;

determining a variable value of the model for each of the regions; and converting the variable value for each of the regions using a second transform matrix into corrected R, G, and B signals for independent color processing.

* * * * *

UNITED STATES PATENT AND TRADEMARK OFFICE
CERTIFICATE OF CORRECTION

PATENT NO. : 5,448,380
DATED : September 5, 1995
INVENTOR(S) : Doo-sik PARK

It is certified that error appears in the above-indentified patent and that said Letters Patent is hereby corrected as shown below:

On the title page, item [54] and Col. 1, lines 1-3,

—[54] COLOR IMAGE PROCESSING METHOD AND APPARATUS FOR CORRECTING A COLOR SIGNAL FROM AN INPUT IMAGE DEVICE

Signed and Sealed this

Twelfth Day of March, 1996

Attest:

BRUCE LEHMAN

*Attesting Officer*     Commissioner of Patents and Trademarks